(12) United States Patent
Azar (10) Patent No.: US 11,104,490 B2
(45) Date of Patent: Aug. 31, 2021

(54) OAK ALTERNATIVE WITH INTERNALLY BUILT IN CONNECTORS AND MODIFIED BUNG TO OAK WINE, BEER, SPIRITS, AND OTHER LIQUIDS

(71) Applicant: Michael Azar, Kutztown, PA (US)

(72) Inventor: Michael Azar, Kutztown, PA (US)

(*) Notice: Subject to any disclaimer, the term of this patent is extended or adjusted under 35 U.S.C. 154(b) by 90 days.

(21) Appl. No.: 16/569,845

(22) Filed: Sep. 13, 2019

(65) Prior Publication Data

US 2020/0087036 A1    Mar. 19, 2020

Related U.S. Application Data

(60) Provisional application No. 62/733,470, filed on Sep. 19, 2018.

(51) Int. Cl.
*B65D 39/00*    (2006.01)
*C12L 9/00*    (2006.01)
*C12G 3/07*    (2006.01)

(52) U.S. Cl.
CPC .......... *B65D 39/0088* (2013.01); *C12G 3/07* (2019.02); *C12L 9/00* (2013.01)

(58) Field of Classification Search
CPC .............. B65D 39/0088; B65D 39/00; B65D 51/1611; C12G 3/07; C12L 9/00
See application file for complete search history.

(56) References Cited

U.S. PATENT DOCUMENTS

| | | |
|---|---|---|
| 334,222 A | 1/1886 | Fitch |
| 429,826 A | 6/1890 | Wagoner |
| 818,478 A | 4/1906 | Shwayder |
| 1,976,091 A | 10/1934 | Pritchett |
| 2,011,865 A * | 8/1935 | Maggenti ............. B67D 1/0829 137/325 |
| 2,017,235 A | 10/1935 | Drew |
| 2,039,902 A * | 5/1936 | Healy ................... B67D 3/044 137/212 |
| 2,079,378 A | 5/1937 | Mills |
| 2,086,073 A | 7/1937 | Francescon |

(Continued)

FOREIGN PATENT DOCUMENTS

| | | |
|---|---|---|
| CZ | 306124 B6 | 8/2016 |
| DE | 102017006899 A1 | 1/2019 |

(Continued)

*Primary Examiner* — Shawn M Braden
(74) *Attorney, Agent, or Firm* — Caesar Rivise, PC (57) ABSTRACT

An apparatus for aging a liquid in a container includes: an elongated bung having a top and a bottom, the bottom having a male or female connector; and an elongated wooden piece having a longitudinal axis, an upper end, a lower end, and a side, the upper end having a male or female connector adapted to connect to the male or female connector of the bottom of the elongated bung, whereby the elongated bung and the elongated wooden piece are removably connected by connecting the male or female connector of the bottom of the elongated bung with the male or female connector of the upper end of the elongated wooden piece. The bung may have a first opening, a side with another opening, the first opening being fluidly connected to the another opening by a pathway adapted to transmit a gas from the container through the first opening.

21 Claims, 8 Drawing Sheets

(56) References Cited

U.S. PATENT DOCUMENTS

| | | | |
|---|---|---|---|
| 2,092,467 A * | 9/1937 | Newman | B65D 51/1683 |
| | | | 217/99 |
| 2,114,009 A | 4/1938 | Ramsay | |
| 2,195,662 A | 4/1940 | Van Sant | |
| 2,203,229 A * | 6/1940 | Nilsson | C12G 3/07 |
| | | | 99/277.1 |
| 2,289,245 A | 7/1942 | Dant | |
| 3,942,423 A | 3/1976 | Herzfeld | |
| 4,509,653 A * | 4/1985 | Corbett | B65D 51/24 |
| | | | 215/231 |
| 4,994,289 A | 2/1991 | Yu | |
| 5,102,675 A | 4/1992 | Howell et al. | |
| 5,481,960 A | 1/1996 | Sullivan | |
| 5,537,913 A | 7/1996 | Vowles | |
| 5,647,268 A | 7/1997 | Sullivan | |
| 6,203,836 B1 | 3/2001 | Gross, II et al. | |
| 6,378,419 B1 | 4/2002 | Ecklein | |
| 7,357,069 B1 | 4/2008 | Karasch et al. | |
| 7,866,254 B1 | 1/2011 | Karasch et al. | |
| 9,155,331 B2 * | 10/2015 | Peasley | A23L 2/56 |
| 9,212,343 B1 | 12/2015 | Karasch et al. | |
| 2010/0215431 A1 * | 8/2010 | Mettler | E01F 9/529 |
| | | | 404/15 |
| 2011/0268838 A1 * | 11/2011 | Vondrasek | C12H 1/22 |
| | | | 426/15 |
| 2016/0097023 A1 | 4/2016 | Peniche | |

FOREIGN PATENT DOCUMENTS

| | | |
|---|---|---|
| GB | 2477308 A | 8/2011 |
| GB | 2490954 A | 11/2012 |
| WO | 2004037967 A1 | 5/2004 |

* cited by examiner

OAK ALTERNATIVE WITH INTERNALLY BUILT IN CONNECTORS AND MODIFIED BUNG TO OAK WINE, BEER, SPIRITS, AND OTHER LIQUIDS

CROSS-REFERENCE TO RELATED APPLICATIONS

This application claims the priority benefit of provisional patent application Ser. No. 62/733,470 entitled "Oak Alternative with Internally Built In Connectors and Modified Bung to Oak Wine, Beer, Spirits, and other Liquids", filed on Sep. 19, 2018, the entire disclosure of which is hereby expressly incorporated by reference herein.

BACKGROUND OF THE INVENTION

Field of the Invention

The invention relates generally to an oak alternative with internally built in connectors and modified bung to oak wine, beer, spirits, and other liquids.

Description of Related Art

Currently there are a number of solutions for adding oak characteristics like aromas and flavors to liquids such as wine for example. Some of these solutions attempt to add oak flavors and aromas to liquids, but these solutions fail to meet the needs of the industry because these solutions do not provide a direct or efficient way to connect their pieces together, and they do not provide a way to secure their pieces to the container without the need for extra external pieces or materials. These extra pieces are not part of the devices and are required in order for these solutions to be secured to each other and to the container.

The other oak alternative solutions can also be dropped into the container but this is inefficient because recovery of the pieces can be time consuming, cause loss of liquid, and exposure to oxidation due to racking. This makes the other solutions cumbersome to use, wasteful, require extra pieces which cost extra money and may need to be sanitized prior to use, can be time consuming to use, force users to damage equipment by screwing hooks on the bungs to secure the mesh bags or strings, can be used only at certain stages of fermentation, and as mentioned earlier can have the potential to increase the risk of unnecessary oxidation and loss of liquid by racking to recover the oak pieces from the liquid. Racking is a term in winemaking where it is the process of siphoning wine, or beer, off of lees and other sediment from fermentation into another container.

Some examples of extra required pieces are connectors, mesh bags, string, rope, hooks, or other means such as tubes to maintain good control of the device or contain the oak material. Some devices require these connectors to be screwed into the bungs which can cause damage to the equipment. Other devices do not provide a convenient means to attach to containers and other pieces, or the devices lack a component to attach or handle the device once inside the container. Some devices, if having no means to attach to the container, are just dropped inside the container and are cumbersome to recover and can only be recovered by racking off the wine. Some devices only provide one function. The recovery time to separate the other oak alternative solutions can be high; and some devices can be used only once and then discarded.

Other solutions attempt to insert multiple pieces of oak into the container, but these solutions are similarly unable to meet the needs of the industry because they are too costly, complicated, inefficient, cause too much of a mess and cleaning, inconvenient to small scale producers as well as large scale producers, and require extra pieces or materials to secure the pieces to each other and to the container.

It would be desirable to have a device with pieces that can connect together and can be secured to the container without the need for extra materials that are not part of the device. A device that is designed to be ready to use once it is taken out of the packaging. Also, a device that can be toasted at various degrees of heat to add oak aroma and flavor characteristics to beverages such as wine in an efficient, fast, clean, and convenient manner, and able to be used immediately with little preparation time. It would also be desirable for a device to have internally built components to attach to one another that would eliminate the need for extra materials to attach or secure the invention to another corresponding piece or to the container.

Furthermore, it would also be desirable to have a device that is sanitary and doesn't require further sanitation of other equipment for the device to be used, and isn't complicated or time consuming to use. Still further, it would be desirable to have a device that is capable of performing multiple tasks and can benefit the winemaker or brewer without taking up too much time while effectively adding oak characteristics to the liquid.

Therefore, there currently exists a need in the industry for an oak alternative that can be conveniently and efficiently connected to each other by internally built connectors and secured to the container through a modified bung, while still delivering a high quality end product and being sanitary, effective, quick and easy to manipulate, cut down on excessive racking, can be added at any stage of fermentation, ready to be used immediately, easily recoverable, and provides an efficient means to add oak complexity to beverages such as wine, spirits, and beer.

BRIEF SUMMARY OF THE INVENTION

Disclosed is an oak alternative which is made up of the following components: toasted oak pieces that can vary in length that are in contact with the liquid equipped with internally built connectors that are made by traditional and unconventional joinery techniques, an accompanied modified bung that provides an airtight seal while securing the oak pieces to the container, a modified bung that has a pathway for gases to escape, a modified bung that can accommodate an airlock or stopper, and a modified bung that has internally built connectors that attach to the oak pieces inside the container.

Joinery is a term that is part of wood working that involves joining two pieces of wood together. This can be accomplished in several ways ranging from simple to complex. An example of a simple type of joinery would be a dovetail joint, and an example of complex methods would be the unique Japanese methods of joinery.

Applicant uses joinery in an oak alternative to provide a solution, a means to connect the oak pieces together by having internally built connectors and even models of this oak alternative that could involve pieces such as wedges. Regardless of what type of joinery technique is used, it provides a means for the parts to connect to each other, a means to be secured to the container, and have the oak alternative ready to be used once it is taken out of the package without any assistance or the need for extra materials that are not essentially part of the oak alternative.

The conventional and unconventional joinery cuts create internally built in connectors so the device can be quickly and easily assembled for immediate use right out of the packaging without the need for external parts or pieces. The oak pieces can be connected to other oak pieces as well as the modified bung through these traditional and creative joinery techniques.

In one embodiment, these components are connected as follows: the modified bung has a vertically centered opening that allows the fitting of an airlock or stopper, and another vertical opening in an oak piece to a length that meets apertures that are perpendicular at a distance lower on the modified bung to the vertical opening, creating a pathway for gases inside a container to escape. Multiple apertures can be provided perpendicular to the vertical opening to increase the number of pathways for gases to escape and relieve pressure inside the container.

The modified bung and oak pieces are connected through internally built connectors that may be made by a variety of joinery techniques that will allow a quick connect and disconnect function to another oak piece and to the modified bung. This will eliminate the need for mesh bags, strings, screws, connectors, or other devices to contain oak pieces. The oak pieces in contact with the liquid can have simple and complex patterns engraved on them to increase the surface area of liquid in contact with oak. The internally built connectors can be joinery cuts such as dovetails, or more complex methods such as threading the oak pieces to replicate a nut and bolt connection method. The single and multiple piece models have the same components except the built in connectors not being needed in the single piece model.

The device may also have one or more of the following: (1) an option to be made as a single piece model or model consisting of multiple pieces that connect with internally built in connectors; (2) the ability to be toasted at a variety of temperatures and time to add greater complexity; (3) the modified bung's internally built in connector point can act as an anchor point where strings, ropes, and mesh bags are tied to without damaging the bung; (4) the modified bung part of the device can be made from oak that can be toasted or food grade material allowing it to be reused; (5) the oak pieces in contact with the liquid can be laser engraved or manufactured on a CNC lathe to have a variety of patterns and shapes to meet the needs of the user; (6) a modified bung that can attach an airlock during fermentation or a corker or other stopper device if an airlock is not desirable or needing to be used; (7) the device can be customized to fit various size containers such as, but not limited to, 1 gallon carboys, 3 gallon carboys, 5 gallon carboys, wine barrels of various sizes, and many other container types, such as demijohns; (8) the oak pieces in contact with the liquid have internally built in connectors that can be linked to another piece by traditional and other creative or unconventional techniques. For example, dovetails can be used for traditional joinery and examples of creative approaches would be adding threads to the oak pieces to screw the pieces together, or mortise and tenon joints with wedges; (9) for larger containers such as barrels and demijohns, the pieces can be scaled to fit the larger diameter of the container's opening and larger diameter oak pieces can be constructed; (10) for barrels, oak pieces can be joined together through joinery angled at 90 degrees, or other degrees, to form a spiral and can be screwed into the barrel; (11) through creative joinery multiple oak pieces can be connected to increase the amount of oak in contact with the wine inside the carboy, for example but not limited to, a screw-type method; (12) messages, symbols, patterns, logos, and other images can be laser engraved onto the device to make it more unique and customized for the user or have these patterns done on a CNC lathe or laser engraver; (13) the modified bung piece of the device can be dipped in a food grade material such as wax for example or other food safe material; (14) an end cap can be made to fit onto the final piece; (15) the oak pieces in contact with the liquid can come in various geometries such as a rectangle, cylinder, hexagonal prism, and various other geometries; (16) a modified bung that is made of silicone, cork, or other food grade material that an oak piece can slide into; (17) for barrels, the modified bung can be scaled to fit the diameter of the bunghole and the first corresponding pieces can be modified to attach to the bung through conventional and unconventional joinery techniques; (18) a handle can be made through joinery that can slide on the top of the modified bung with an opening equal or larger in diameter to the opening that fits the airlock or stopper; (19) the modified bung has a matching internally built in connector to the oak pieces; (20) the device can have the option of having no apertures allowing gases to escape and remain as solid pieces; and (21) the modified bung and oak pieces can be modified to have multiple oak pieces connect to the bung in a side-by-side manner and hang into a container.

Applicant's device has many benefits and advantages when compared with other known devices and solutions because it provides one or more of the following: (1) internally built in connectors made by conventional and unconventional joinery techniques to connect pieces together; (2) a means to conveniently attach to the container easily and quickly by the use of a modified bung; (3) a modified bung that will allow gases from the fermentation process to escape through apertures located horizontally and vertically that provide paths for gases to escape; (4) the modified bung can be manufactured from oak or oak in combination with other food grade materials; (5) the vertically drilled opening on the bung can vary in diameter to allow a variety of airlocks to be attached to the device; (6) a modified bung that creates an air tight seal with the container by having the addition of a food grade O-ring, the use of other material to create an airtight seal, or having a conical shape that with downward pressure creates a seal with a container's circular entrance; (7) allows for easy removal and insertion in containers by the modified bung which can act as a handle, and through joinery is attached to the oak pieces in contact with the liquid; (8) eliminates the need for extra pieces such as string, rope, mesh bags, hooks, screws, containers, and other equipment by using internally built in connectors through the use of a variety joinery techniques to attach the pieces together rather than relying on the items listed; (9) can be manufactured to a variety of lengths depending on what container is used such as, but not limited to, 3 gallon carboys, 5 gallon carboys, barrels, and containers of other sizes; (10) the option of connecting multiple oak pieces together by joinery techniques can allow the user to customize the length they want the device to be in the container, or how many oak pieces to be inside the container, connecting different toasts together, as well as how much oak will be in contact with the liquid; (11) can be used at all stages of the fermentation process which can eliminate excessive racking, which also limits the chance of unnecessary oxidation from occurring and loss of liquid; (12) easier manipulation of the device so the user can taste the liquid, save time, and increase efficiency of use by easily grabbing the modified bung portion of the device that acts as a handle, and inserting it back into the container or into another container; (13) easy to maintain and store by quick assembly and disassembly, which allows the device to be reused or placed into another container to oak another batch; (14) provides a convenient way to monitor long term storage of the device inside a container by being easy to use and manipulate; (15) all of the device's components can be toasted to the users desired specification; (16) can be manufactured as a multiple piece model with internally built in connectors or a single unit model; (17) joinery cuts can be made at various angles to maximize the amount of oak inserted into a container; (18) various patterns can be engraved or cut into the device to maximize the amount of surface area of oak in contact with the liquid; (19) the multiple piece model will allow the user to decide how many pieces will be in contact with the liquid giving the user more control of the oak extraction occurring in the liquid; (20) the multiple pieces can come in a variety of geometries such as, but not limited to, rectangles, cylinders, octagons, and hexagons; (21) can allow even greater complexity to the liquid by connecting different varieties of oak at different degrees of toast, for example having a combination of French, American, and Hungarian oak at different toasts that are easily connected together; (22) various joinery techniques and methods can be used to connect the pieces together; (23) the bung and oak pieces can be modified to fit larger diameter container holes such as barrels and demijohns; (24) creative and non-traditional joinery can allow more complex ways to insert the pieces into a container and connect the pieces; (25) the oak pieces can vary in length; (26) by eliminating the need for extra materials the device can cut down on waste as well as costs of purchasing extra materials; (27) the design of the disclosed device centers the oak pieces in the container allowing for greater extraction; and (28) the silicone bung version can allow for the purchase of replacement kits and the silicone bung may be reused.

The disclosed device is structurally different from other known devices or solutions by having built in connectors and provides more functions than other known devices or solutions. More specifically, the device has the following features: (1) an accompanied modified bung with an internally built in connector that connects and secures the oak pieces to a container via joinery techniques or can be permanently fixed to in the single piece model; (2) the use of joinery techniques as a means of connecting the pieces together by having the connectors internally built into the individual oak pieces and bung. This will allow the user to eliminate the need for extra pieces such as connectors, strings, rope, containers, or other equipment and materials; (3) an accompanying modified bung that can accommodate an airlock or stopper; (4) an accompanying modified bung that creates an air tight seal by its geometric shape, O-ring or other method made from food grade material, or custom silicone bung that an oak piece can be inserted into; (5) oak pieces in contact with the liquid that can attach to the modified bung as well as other oak pieces through creative, conventional, and unconventional joinery techniques that create internally built connectors; (6) oak pieces that can be customized to various lengths; (7) the use of a laser engraver or CNC lathe can make angled slits, slits perpendicular to the length of the device, slits vertically cut to the length of the device, and other various patterns and shapes to maximize surface area of oak to liquid; (8) slits cut vertically half way into or all the way through extending the entire length of the device or specified distance; (9) the accompanied modified bung being able to be constructed out of oak or other food safe material; (10) the piece may be centrally located inside a container to allow for greater extraction; and (11) the use of joinery techniques may allow greater manipulation of how the oak pieces can be arranged inside of containers.

Applicant will now provide a more detailed and specific description that will refer to the accompanying drawings. The drawings and specific descriptions of the drawings, as well as any specific or alternative embodiments discussed, are intended to be read in conjunction with the entirety of this application. The oak alternative with internally built in connectors and modified bung to oak beverages and spirits may, however, be embodied in many different forms and should not be construed as being limited to the embodiments set forth herein. Rather, these embodiments are provided by way of illustration only and so that this application will be thorough, complete and fully convey understanding to those skilled in the art.

DETAILED DESCRIPTION OF THE INVENTION

The present invention is directed to an oak alternative with internally built in connectors and modified bung for wine, beer, spirits, and other liquids. Applicant's oak alternative and the various components described herein and illustrated in the drawings are not limited to oak, and may be made out of other wood varieties, including but not limited to cherry, hickory, hard maple, soft maple, white ash, yellow birch, rosewood, redwood, cedar, beech, apple, pecan, walnut, chestnut, other varieties, and any combinations of such woods with or without other materials.

Figure 1:
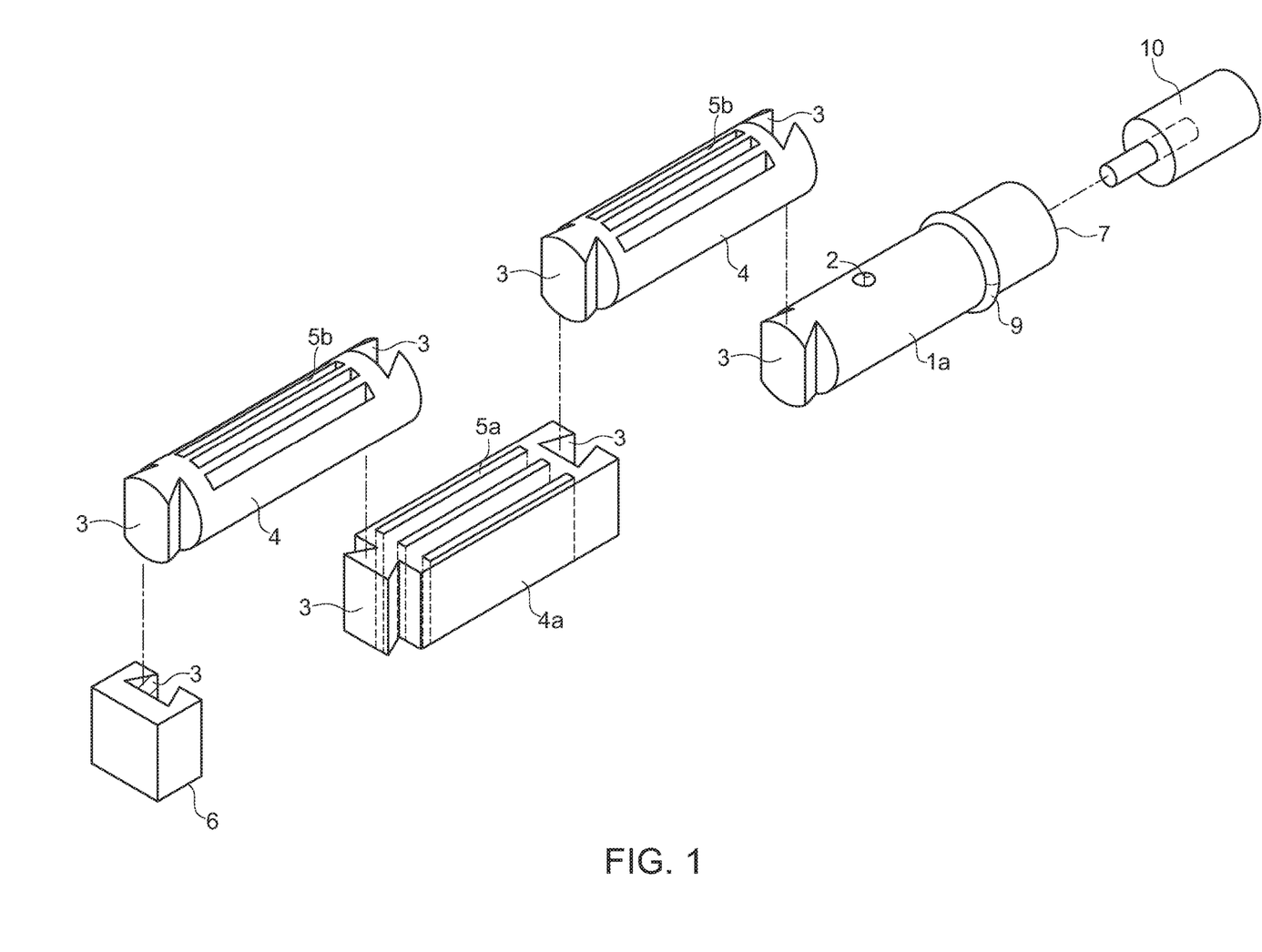
FIG. 1 is a perspective view of one embodiment of the device that illustrates how the pieces connect together by the internally built in connectors.
Figure 2:
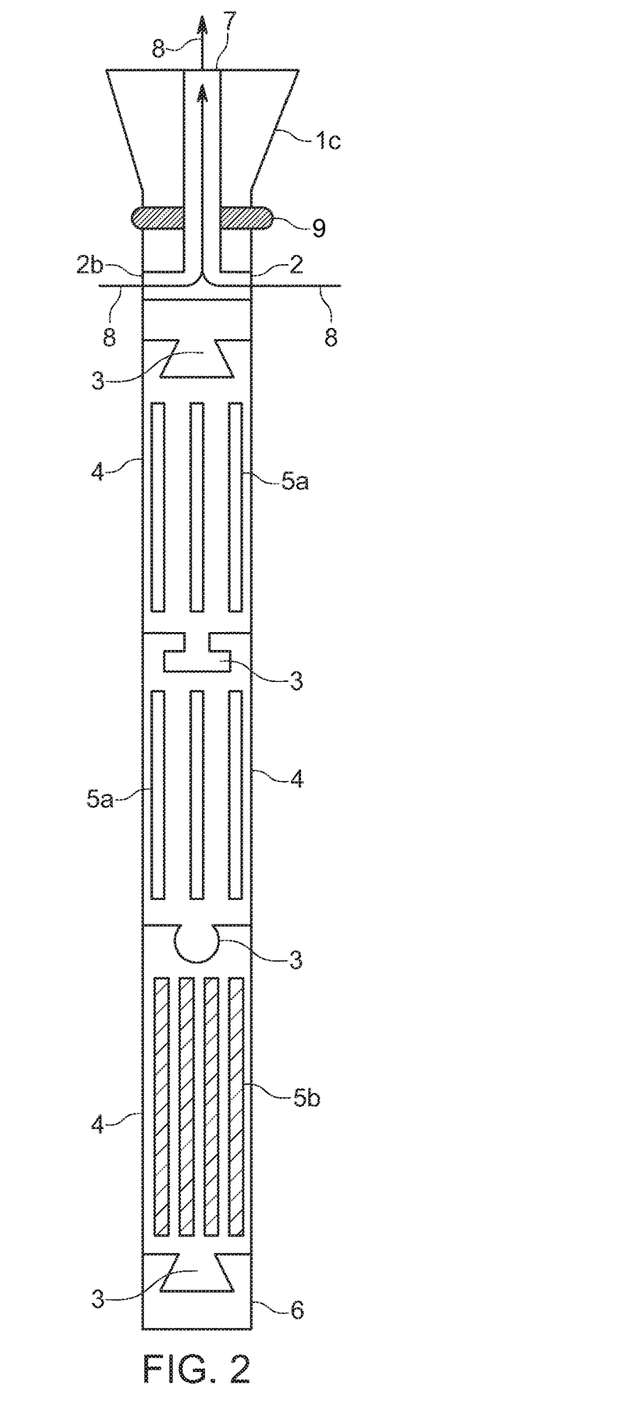
FIG. 2 is a cross-sectional side view that shows an exemplary embodiment of the bung design that accommodates an airlock and types of joinery by a top to bottom connection.
Figure 3:
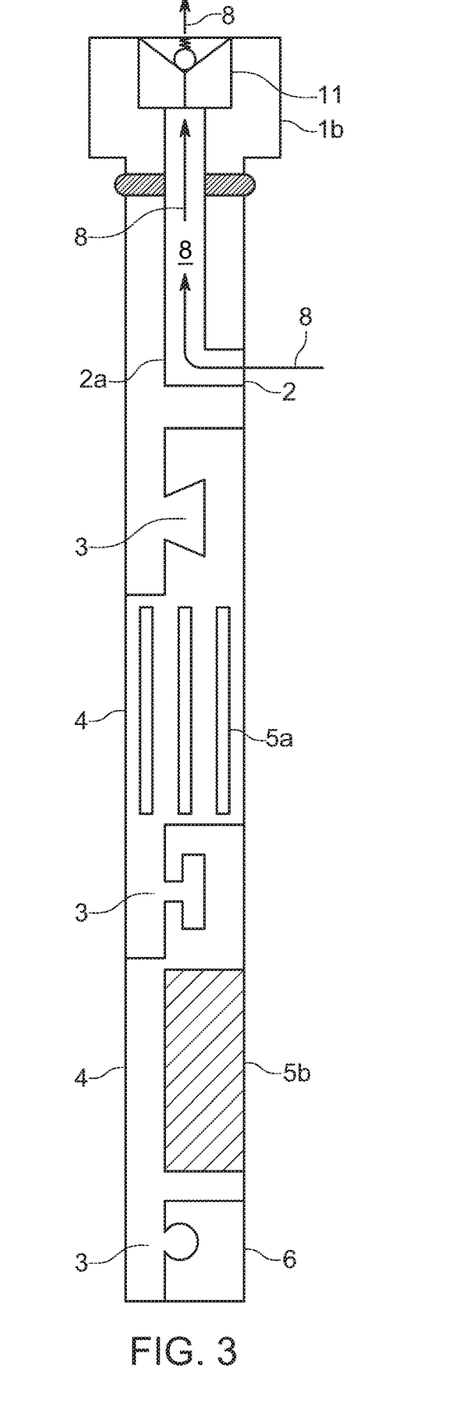
FIG. 3 is a cross-sectional side view that shows another exemplary embodiment of the bung design accommodating a check valve and types of joinery that connects from side to side.
Figure 4:
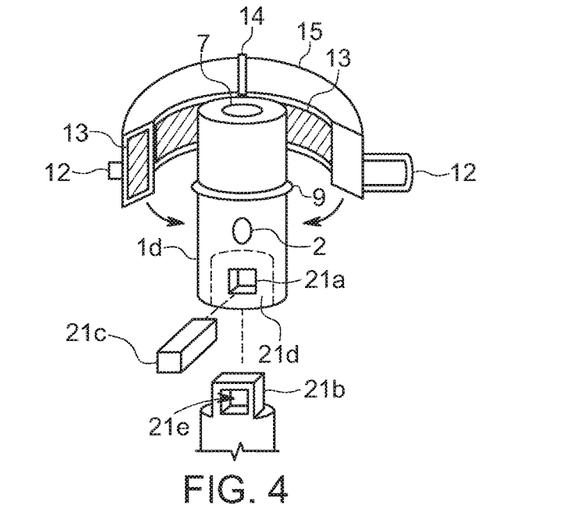
FIG. 4 is a perspective view of an exemplary embodiment of a modified bung.
Figure 6:
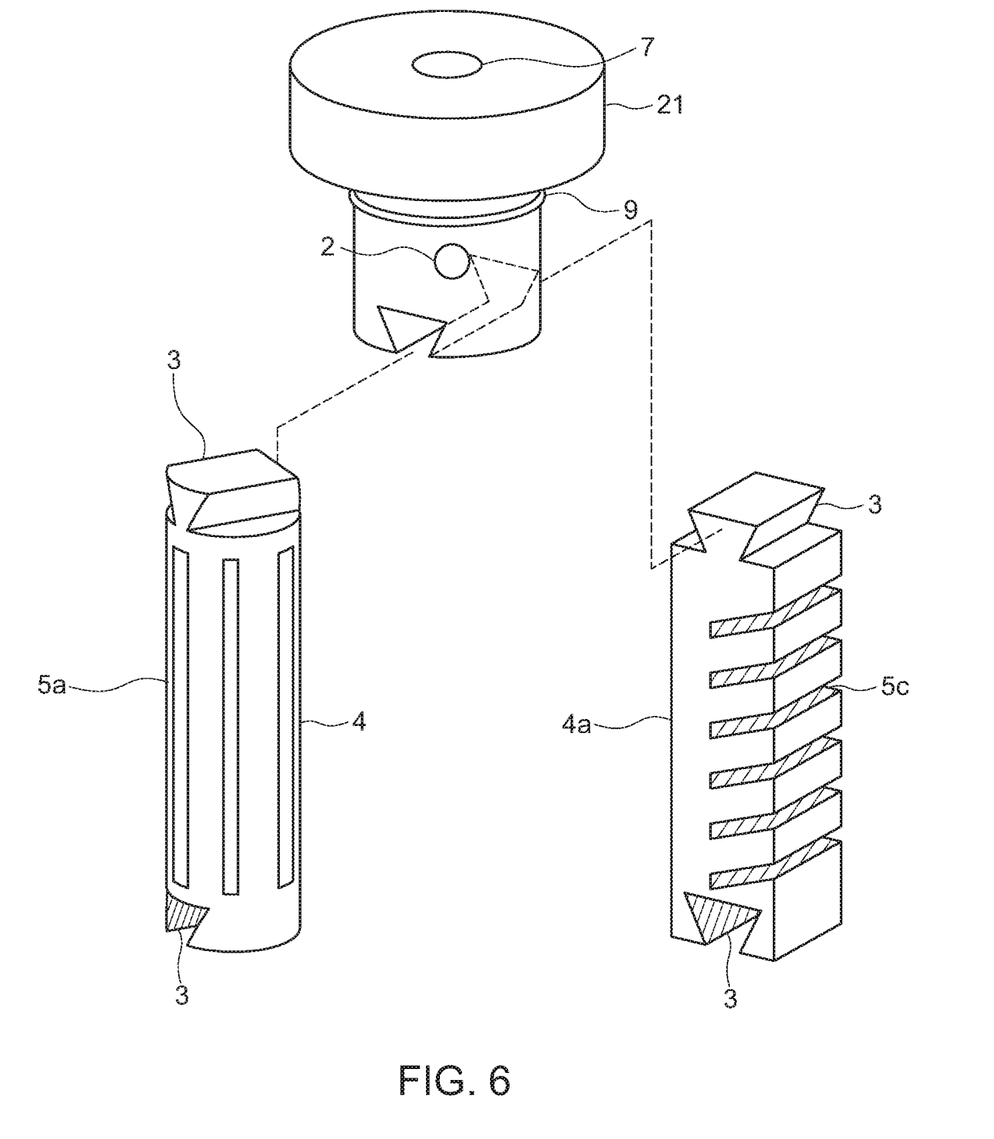
FIG. 6 is a perspective view of a side by side connection of oak pieces hanging down from a modified bung for a larger container opening.
Figure 8:
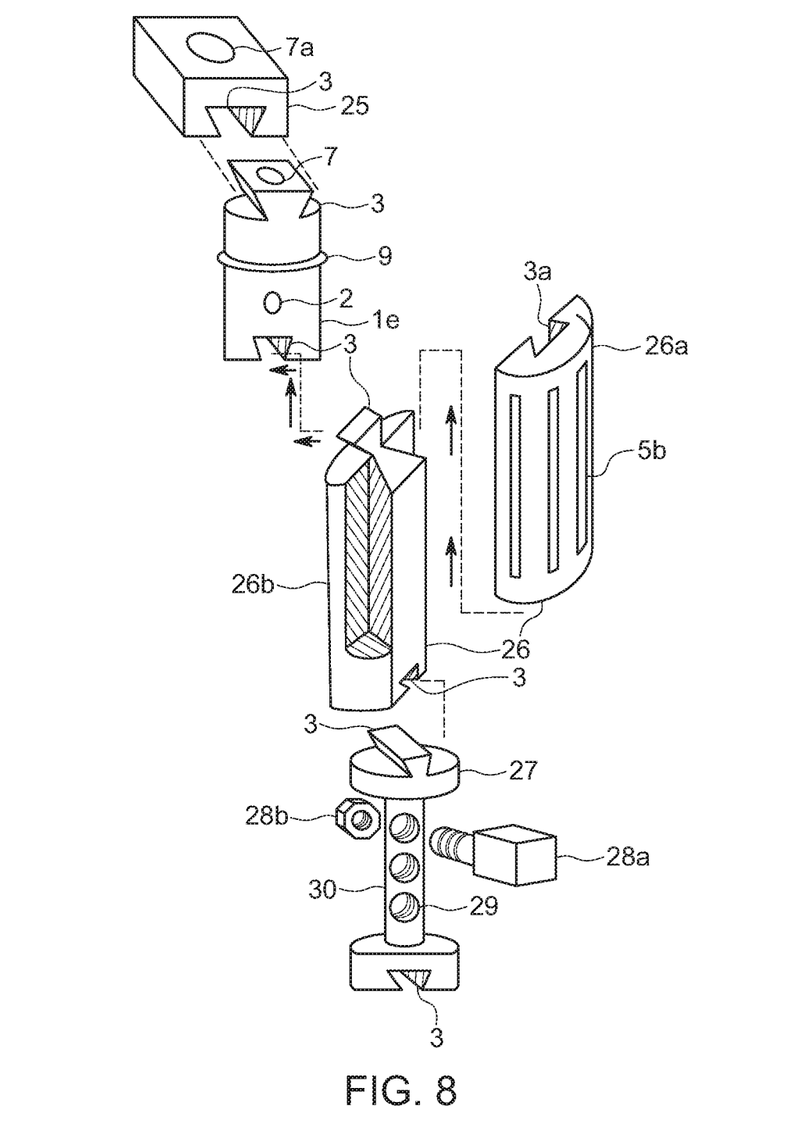
FIG. 8 is a perspective view of another exemplary embodiment of a modified bung with other possible modifications of the device.

In one embodiment the device has a modified bung 1a, shown FIG. 1, made from oak or other food grade material. However, there are other variations of modified bungs. For example, FIG. 2 shows a conically shaped modified bung 1c, FIG. 3 shows a square or rectangular top bung 1b, FIG. 4 shows a complex modified bung 1d, FIG. 6 shows a larger scale circular top modified bung 21, and FIG. 8 shows a sliding handle bung 1e.

The modified bung 1a shown in FIG. 1 will be referenced the most, since it is in a basic form that can be further modified. On the top of the modified bung 1a there is a vertical opening 7 to accommodate an airlock 10. The vertical opening 7 can be seen in better detail in FIG. 9. A food grade O-ring 9 surrounds the modified bung 1a, and an entry opening 2 connects to the vertical opening 7 through a pathway 8 (not shown) where gases can escape through the airlock 10. (Pathway 8 in this embodiment is similar to pathway 8 in the embodiment shown in FIG. 3.) At the bottom of the modified bung 1a an internally built connector 3 is adapted to attach to oak pieces 4. Oak pieces 4 and 4a include internally built connectors 3 at the top and bottom of each piece to allow a connection to other pieces and connection to the modified bung 1a. Full vertical cuts 5a cut completely through the oak pieces 4a or varied vertical cuts 5b cut a certain distance into the oak pieces 4, as shown in FIGS. 1-9. The vertical cuts 5a and 5b increase the amount of oak surface area in contact with the liquid.

The internally built connectors 3 can be made in a variety of ways but consist of male and female connectors so the oak pieces 4 and 4a can connect together. For example, in FIGS. 1-9 a dovetail joinery cut is shown where, in joinery terms, the tails would be considered the male end and the pins would be considered the female end to which the tails securely fit into. To further describe the male and female connectors consider a nut and bolt. The bolt is the male end that would screw into the nut which is the female end that receives the bolt. The female end, in general, is considered the receiving end where the male end is the one inserting, like the nut and bolt just mentioned. In the case of joinery, the dovetail cuts include a tail end and pin end. The pins are the receiving end where the tails can slide onto. Two male dovetail cuts can be made on the same piece but it is preferred to have opposite cuts so all the pieces can be uniform and can connect together logically and without needing an intermediate piece.

Because the opening of containers, for example carboys and barrels, generally are circular, the oak pieces 4 illustrated in the drawings are cylindrical in appearance. However, persons skilled in the art will recognize that many other shapes may be used. For example, the oak pieces 4 can be further modified if desired to other geometric shapes, as shown by rectangular oak pieces 4a in FIG. 1 and FIG. 6, as well as other geometries. The cylindrical shape is the most efficient when it comes to not wasting the oak material during manufacturing. The rectangular oak piece 4a shows how the basic cylindrical shape of oak piece 4 can be further modified. Oak piece 4 is referenced as the basic version that can be built off of because the opening of most containers are circular.

In a single piece version, the modified bung 1a and oak pieces 4 are a single unit.

The components are connected as follows. The modified bung 1a is manufactured to fit inside an opening of a container that contains a liquid. Such containers may be glass carboys, demijohns, and barrels, usually with a circular opening, but other opening shapes are possible. The top of the modified bung 1a can be manufactured in a variety of ways. Examples are a square or rectangular top modified bung 1b in FIG. 3; a conically shaped modified bung 1c in FIG. 2; a circular top modified bung 21 in FIG. 6, and in FIG. 9 a silicone bung 9s that can have oak pieces inserted into it. The silicone bung 9s can also be made of cork or other food grade material.

The modified bung 1a in FIG. 1 may have a small ring etched around the circumference of it to accommodate a food grade O-ring 9 that will create an air tight seal to the container's opening.

The oak manufactured modified bung or food grade material version can be made to such tolerances that the forces exerted downward can create an air tight seal if a food grade O-ring 9 is not desirable. Below where the modified bung creates the air tight seal to the container's opening, a laterally drilled hole may be drilled to a length that is equal to the radius or diameter of the modified bung 1a creating an entry hole 2, in a sense half way or the entire diameter of the modified bung 1a. Drilling a hole that is half the diameter 2a of the modified bung 1a will create one entry hole 2, as shown in FIG. 3. Drilling a hole the entire diameter 2b of the modified bung 1a will create two entry holes 2, as shown in FIG. 2 as 2b and 2. A second vertical opening 7 may be drilled longitudinal (from the top down) and centered from the top of the modified bung 1a to the laterally drilled hole where the entry hole 2 is formed. The initial depth drilled for the vertical opening 7 will allow the airlock 10 and stopper to remain securely upright.

Figure 9:
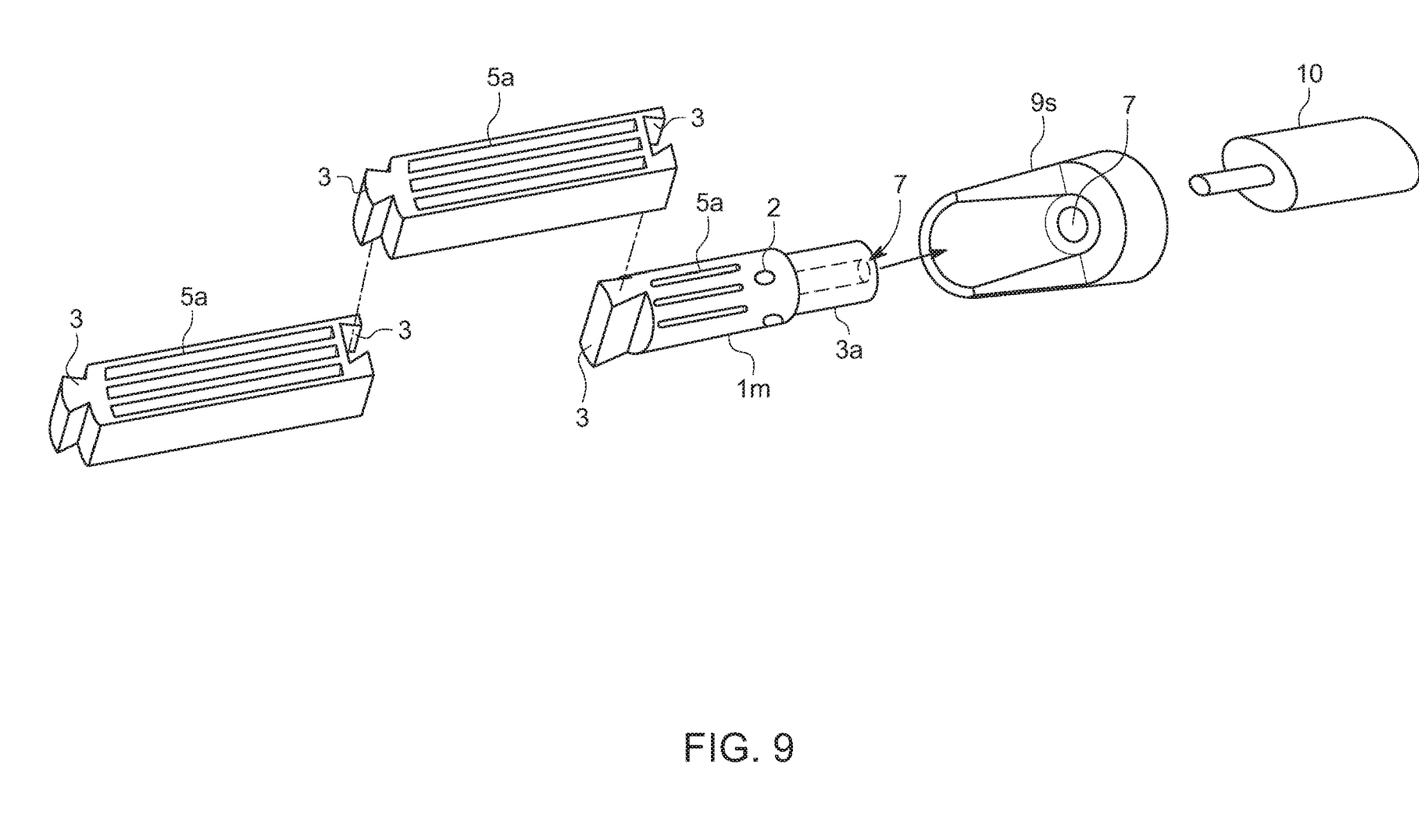
FIG. 9 is a perspective view of another exemplary embodiment of the device.

In FIG. 9, the vertical opening 7 is both in the silicone bung 9s as well as the connecting end 3a on the modified oak bung 1m. Below this depth the diameter of the vertical opening 7 can remain the same or be drilled at smaller diameters to the laterally drilled hole creating the entry hole 2. The laterally drilled hole creating the entry hole 2 can vary in diameters as well but large enough to allow the gases to escape without building up a significant amount of pressure within the container that will cause the airtight seal to be broken. The airlock 10 will prevent any outside gases from entering the container. When fermentation is complete the modified bung 1a can allow the user to continue using the airlock 10 or insert a stopper in the vertical opening 7 to let the liquid age inside the container.

The bottom of the modified bung 1a, regardless if made from oak or molded from a food grade material, will have a means to attach to the corresponding oak pieces 4 and 4a in contact with the liquid or act as an anchor to attach other solutions to oak beverages, through the internally built connector 3. The oak version can have a variety of joinery techniques to connect the pieces together. There are too numerous of joinery techniques to describe that cannot be covered entirely but some are illustrated as examples in FIG. 2 and FIG. 3. Some examples of joinery techniques are dovetails, a T-configuration cut, circular and ball cuts, and a cut that resembles two hooks connecting (hooks not shown in figure). Traditional wood joinery techniques are not the only ways to make the internally built connectors 3. Some complex ways to make the internally built connectors 3 are based off of the mortis and tenon connections where also a wedge is inserted to secure the pieces. Another creative way to make internally built connectors 3 is replicating a nut and bolt where the oak pieces 4 and 4a will have threads so the pieces can screw together.

The length of the single piece model of the device will be long enough as to not come in contact with bottom of the container. The reason for this is because a lot of the sediment from the fermentation process settles at the bottom of the container and should not be stirred up. The modified bung 1a will be connected to the oak pieces 4 and 4a in contact with the liquid inside the container and also act as a means to quickly insert and extract the pieces once inside the container. The internally built connectors 3 will allow the pieces to be connected and disconnected quickly and easily. The oak pieces 4 in contact with the liquid may be manufactured to the shape of a cylinder or may be modified to rectangular oak pieces 4a as shown in the embodiment illustrated in FIG. 1. The basic shape of the oak pieces 4 may be in the shape of a cylinder because of the circular openings of many containers. The rectangular oak piece 4a is an example of how the oak pieces can be modified to other shapes, and other geometric possibilities are endless. The oak pieces may also be creatively customized to various geometries such as, but not limited to, a hexagon and octagon as well. Also, with a variety of router bits the oak pieces 4 can come in a variety of shapes as well.

The length of the device once put together can extend the length of the container and can be customized to various lengths depending on the size of the container. For example, one of the most common containers being 5 gallon glass carboys. The length of each individual oak piece 4 can be customized to various lengths and diameters as well. The length of the device will also be able to be customized by the user by connecting multiple oak pieces 4 together made possible by the internally built connectors 3 to the user's desired length. This is accomplished by having multiple oak pieces 4 having internally built connectors 3 with a male and female connector ends at the top and bottom of the pieces that allow the pieces to securely slide onto each other.

The internally built connectors 3 at the top and bottom of each oak piece 4 can be made at angles as well to try and maximize the amount of oak pieces 4 in the container. This is discussed below in detail with respect to FIG. 5. To increase the surface area of oak in contact with the liquid, full vertical cuts 5a are cut all the way through oak pieces 4. There is also an option to have varied vertical cuts 5b on the oak pieces 4 that can vary in depth. Laser engraving and creative techniques on a CNC lathe can allow for greater creativity and 3-dimensional patterns to be made. Creative router bits can also allow for unique shapes to be made on to the oak pieces 4. Holes can also be drilled laterally and at angles on the oak pieces 4 to increase the area of oak interacting with the liquid.

To make the manufacturing of the device simpler, a single piece model may be made entirely out of oak that will combine the modified bung 1a and oak pieces 4 in contact with the liquid as one unit, and then inserted into the silicone bung 9s by having a connecting end 3a. This is accomplished by eliminating the internally built connectors 3 and customizing the piece to the length of the container that will be used.

As discussed, the modified bung 1a can be made in various ways as shown in the Figures There are many creative ways to create the modified bung 1a, such as in the shape of balls, conical shapes, and other geometries. A method similar to joinery is a screw version where the several varieties of internally built connectors 3 made by joinery cuts are replaced with a screw version that is the same concept as a nut and bolt. In the screw version of the modified bung, the internally built connectors 3 in contact with the oak pieces 4 would have threads made onto each piece so they can screw onto one another, and a corresponding bolt that would screw on the top of the modified bung 1a, similar to the ring 15 in FIG. 4 for easy insertion and extraction from the container.

FIG. 4 shows an alternative way to construct a bung. The complex modified bung 1d shown in FIG. 4 is similar to the modified bung 1a but would be attached to a ring 15 that can open due to a hinge 14 and securely close by a latch mechanism 12. To give added pressure to secure the complex modified bung 1d in the ring 15, padding 13 may line the inside of the ring 15 and closing face.

FIG. 4 also shows another way to attach components together. FIG. 4 shows a concept similar to mortis and tenon joinery with wedge to connect the pieces together. There is a hollow cavity 21d where the fixture end 21b on the oak piece fits into. There is also a hole 21a on the complex modified bung 1d that is aligned to a hole 21e on the fixture end 21b. To secure the pieces together a wedge 21c fits in the holes 21a on the complex modified bung 1d and fixture end 21b of the oak piece.

Figure 5:
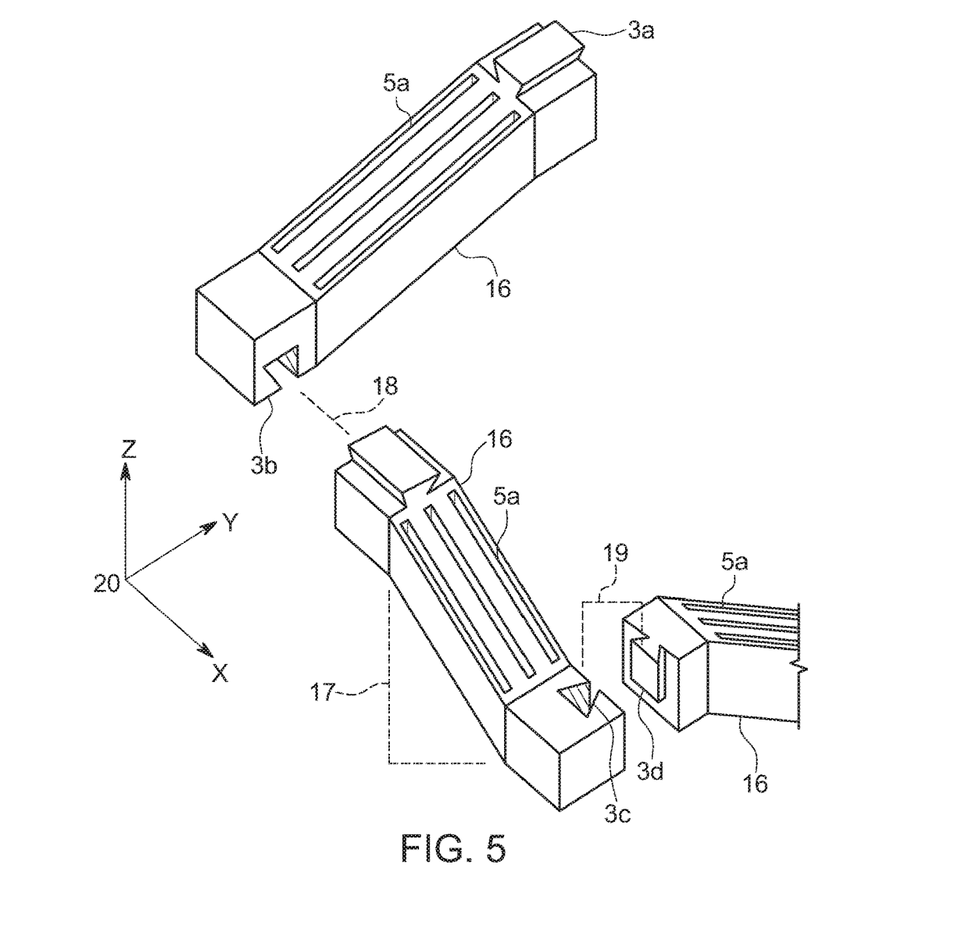
FIG. 5 is a perspective view of an exemplary embodiment of the device illustrating the use of joinery techniques to attach oak pieces at angles and create a screw motion into a container with multiple pieces.

FIG. 5 shows an embodiment in which joinery is used to connect multiple pieces at angles to increase the amount of oak inside a container, for example inside a barrel. The configuration in FIG. 5 shows the angled oak pieces 16 connected at 90 degree angles to one another. The oak pieces are modified to make angled oak pieces 16, and the lines 17 in FIG. 5 refer to the angle of the angled oak pieces 16, where one end of the piece is higher than the other end similar to a diagonal line. The angled oak pieces 16 have the full vertical cuts 5a shown in FIG. 5.

The angled oak pieces 16 can have a variety of methods to attach to corresponding pieces. For example, the joinery cuts on the angled oak piece 16 may be made at cuts that are perpendicular to one another. If one looks at a 3-dimensional X, Y, and Z plane 20, one joinery cut 3a along the Y-axis and be made on top of the angled oak piece 16, and the other joinery cut 3b along the X-axis and be made on the bottom of the angled oak piece 16. On an X, Y, and Z plane 20, X and Y axis are perpendicular to one another. These cuts allow a sliding connection 18 where the joinery cut 3a along the Y-axis slides onto the joinery cut 3b along the X-axis on another angled oak piece 16, creating a 90 degree angle. As more and more angled oak pieces 16 connect together they form a spiral motion inside the container.

Another way to slide the pieces onto one another is through a vertical connection 19. This is made possible by taking the joinery cut 3a along the Y-axis and rotating it 90 degrees downward to form a new rotated Y-axis facing joinery cut 3d, and taking the joinery cut 3b along the X-axis and rotating it 90 degrees upward forming a new rotated X-axis facing joinery cut 3c. The new rotated Y-axis facing joinery cut 3d will slide by a vertical connection 19 on the Z-axis onto the new rotated X-axis facing joinery cut 3c located on another angled oak piece 16 shown in FIG. 5. The rotated Y-axis facing joinery cut 3d and rotated X-axis facing joinery cut 3c are made so that the two angled oak pieces 16 do not slide off of each other. The angled oak pieces 16 may be connected to the variety of bungs illustrated throughout the figures.

FIG. 5 shows how the device can be modified to a complex screw motion as the pieces get connected and inserted into a container. FIG. 6 shows another embodiment in which the device can be modified to fit inside a larger container while still keeping the same principles used in smaller containers. FIG. 6 shows a circular top modified bung 21 that is larger in size to fit the diameter of larger openings, such as in barrels and demijohns. The circular top modified bung 21 is large enough to accommodate multiple oak pieces 4 that can hang side by side to one another inside the container, and also have more oak pieces 4 attached to them by the internally built connectors 3. FIG. 6 shows the ability to hang two oak pieces 4 side by side, but another bisecting cut on the bottom of the circular top modified bung 21 can allow the possibility to increase from 2 to 4 oak pieces 4 hanging down from the circular top modified bung 21. The cylindrical oak pieces 4 shown in FIG. 6 can come in a variety of geometries, such as a rectangular oak piece 4a with a variety of cuts, such as an angled cut 5c shown in the rectangular oak piece 4a in FIG. 6, or the full vertical cuts 5a.

Figure 7:
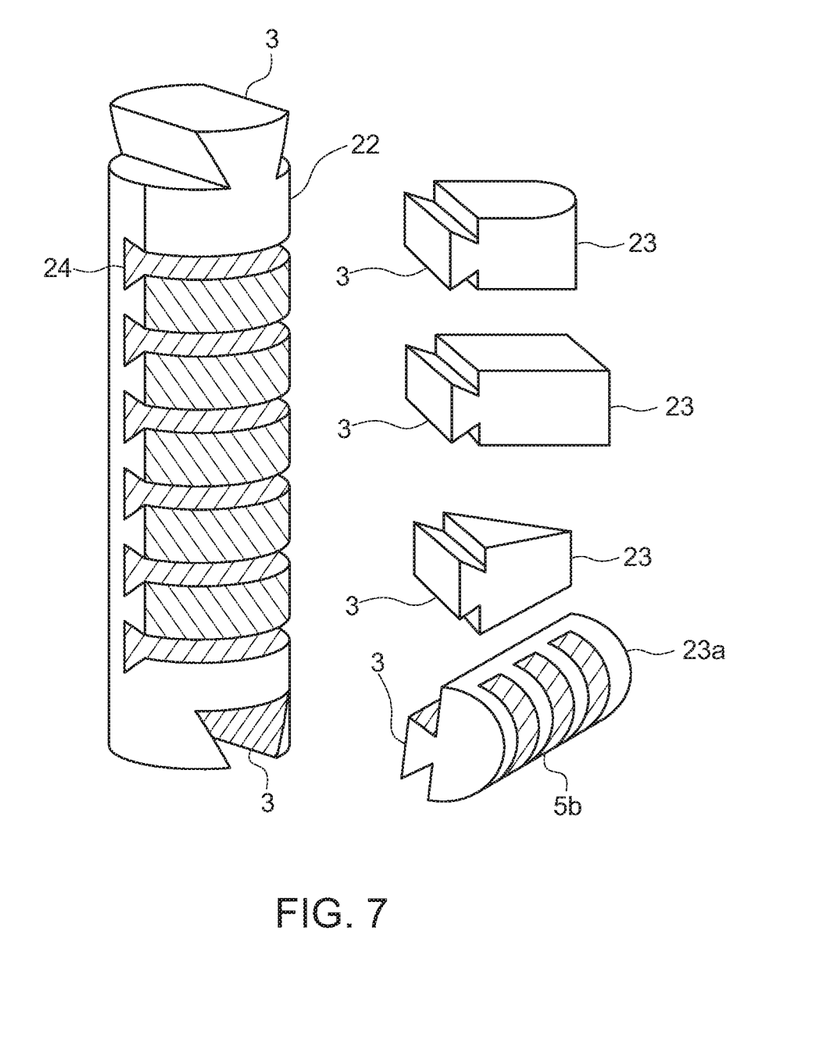
FIG. 7 is a perspective view of another exemplary embodiment of the device with pieces of varying shapes that slide in and out of the device through joinery.

FIG. 7 is another modification 22 where the full vertical cuts 5a are replaced with geometric oak pieces 23 or complex oak pieces 23a that have the same internally built connectors 3 to attach to the modification 22. The geometric oak pieces 23 and complex oak pieces 23a internally built connectors 3 will slide into the horizontal cuts 24 on the modification 22. The geometric oak pieces 23 shown in FIG. 7 can come in a variety of shapes as well as a more complex oak piece 23a that have the varied vertical cuts 5b. The internally built connectors 3 on the top and bottom of the modification 22 also give the ability to connect to a modified bung 1a or another corresponding piece.

FIG. 8 shows other modifications that demonstrate the endless possibilities to use joinery techniques. The sliding handle bung 1e in FIG. 8 is a modification of the basic modified bung 1a in that an in internally built connector 3 is added to the top part of the sliding handle bung 1e. This allows for a handle 25 to attach to the sliding handle bung 1e through its own internally built connector 3. The handle 25 seen in FIG. 8 shows a common dovetail joinery cut as an internally built connector 3 but can also be modified to have threads similar to a bolt, simulating how a nut and bolt screw onto one another. The handle 25 will have a vertical hole 7a drilled on the top, that is centered, and drilled all the way through that is equal or greater to the diameter of vertical opening 7, where the stopper or airlock 10 attaches.

FIG. 8 also shows sliding modification 26 and a screw modification 27. The sliding modification 26 consists of two pieces. A sliding piece 26a that has the shape of a cylinder that has been cut in half with a dovetail cut down the flat side and the entire length of the piece that acts as an internally built connector 3a. The sliding piece 26a shows the varied vertical cuts 5b to increase as much oak surface area in contact with the liquid. There is also the option of having patterns engraved as well.

The connecting piece 26b will receive the sliding piece 26a by a vertical connection and will also have internally built connectors 3 on the top and bottom that can attach to whichever version of bung already discussed or another corresponding piece. The connecting piece 26b will have a corresponding dovetail cut to receive the sliding piece 26a but the cut won't go the entire length of the piece but stop short just above and below the joinery cuts that form the internally built connectors 3 on the top and bottom of the connecting piece 26b. In this example a dovetail joinery cut was used but other cuts can be made as well.

The screw modification 27 shows another approach to attach oak pieces. The modified oak pieces are comprised of two pieces, an oak piece 28a that has threads seen on a bolt and a corresponding wooden nut 28b that connect together through a pathway 29 on a central shaft 30 on the screw modification 27. The wooden nut 28b can be an extra option to secure the oak piece 28a, but the pathway 29 will also have threads to allow the oak pieces 28a to be directly screwed onto the central shaft 30. The screw modification 27 also has the internally built connectors 3 on either end to attach to other pieces as well as to the bung.

FIG. 9 shows another embodiment. It has a modified oak bung 1m that can vary in length and has the option to have the full vertical cuts 5a on it. The modified oak bung 1m has a connecting end 3a that slides onto a silicone bung 9s made of silicone or other food grade material. The airlock 10 is connected on the silicone bung 9s through the vertical opening 7, and another vertical opening 7 is drilled into the modified oak bung 1m to allow a path for gases to escape.

The silicone bung 9s can be reused and oak replacement kits purchased. However, the silicone bung 9s can be made of cork or other food grade material.

The option of having an end cap 6 in FIG. 1 will allow the end joinery cuts to be covered up if so desired. Another option is having a check valve 11 shown in FIG. 3 inserted in place of an airlock 10.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

What is claimed is:

1. An apparatus for infusing or aging a liquid in a container, comprising:
   an elongated bung having a top with a first opening, a side with at least one other opening, the first opening being fluidly connected to the at least one other opening by a pathway adapted to transmit a gas from the container through the first opening, and a bottom opposite the top, the bottom having at least one male or female connector; and
   at least one elongated wooden piece having a longitudinal axis, an upper end, a lower end opposite the upper end, and a side, the upper end having at least one male or female connector adapted to connect to the at least one male or female connector of the bottom of the elongated bung,
   whereby the elongated bung and the at least one elongated wooden piece are removably connected by connecting the at least one male or female connector of the bottom of the elongated bung with the at least one male or female connector of the upper end of the at least one elongated wooden piece.

2. An apparatus as in claim 1, further comprising:
   at least one other elongated wooden piece having a longitudinal axis, an upper end, a lower end opposite the upper end, and a side, said upper end having at least one male or female connector adapted to connect to another male or female connector on the lower end of the elongated wooden piece.

3. An apparatus as in claim 2, wherein at least one of the elongated wooden piece and the other elongated wooden piece has at least one open cut in the side of said elongated wooden piece.

4. An apparatus as in claim 1, further comprising a gasket surrounding an outer periphery of the elongated bung.

5. An apparatus as in claim 1, wherein the first opening of the top of the elongated bung is fluidly connected to an airlock or a stopper.

6. An apparatus as in claim 1, further comprising a check valve disposed in the elongated bung and being fluidly connected to the pathway.

7. An apparatus as in claim 1, wherein at least a portion of the elongated bung is made of a material selected from a group comprising silicone, cork, another food grade material, or a combination thereof.

8. An apparatus as in claim 2, wherein the longitudinal axis of the elongated wooden piece is at an angle to the longitudinal axis of the other elongated wooden piece when the lower end of the elongated wooden piece is connected to the upper end of the other elongated wooden piece.

9. An apparatus as in claim 2, wherein there is an angle in at least one of the longitudinal axis of the elongated wooden piece and the longitudinal axis of the other elongated wooden piece.

10. An apparatus as in claim 1, wherein the side of the at least one elongated wooden piece has at least one open cut in the side.

11. An apparatus as in claim 10, wherein the at least one open cut is substantially parallel with at least a portion of the longitudinal axis of the at least one wooden piece.

12. An apparatus as in claim 10, wherein the at least one open cut is at an angle to at least a portion of the longitudinal axis of the at least one wooden piece.

13. An apparatus as in claim 10, further comprising:
at least one wooden piece having a geometric shape and a male connector adapted to fit into the at least one open cut in the side of the elongated wooden piece.

14. An apparatus as in claim 10 having a plurality of open cuts in the at least one elongated piece, wherein at least one of said open cuts is different than an other of said open cuts in at least one characteristic selected form a group comprising length of cut, depth of cut, width of cut, angle of cut, uniformity in shape of cut, and a combination thereof.

15. An apparatus as in claim 1, wherein at least a portion of the at least one elongated wooden piece is toasted.

16. An apparatus as in claim 1, wherein the at least one female connector at the bottom of the elongated bung is removably connected to the at least one male connector at the top of the at least one elongated wooden piece by a wedge.

17. An apparatus as in claim 1, wherein the at least one elongated wooden piece comprises at least two separate parts removably connected to each other.

18. An apparatus for oaking or aging a wine, beer, whiskey, spirits or other such liquid in a container, comprising:
an airlock;
an elongated bung made at least in part of silicone or cork and having a top with a first opening fluidly connected to the airlock, a side with a second opening, the first opening being fluidly connected to the second opening by a pathway adapted to transmit a gas from the container through the first opening, and a bottom opposite the top, the bottom having a female dovetail joinery cut;
a gasket surrounding an outer periphery of the elongated bung;
a first elongated oak piece having a longitudinal axis, an upper end, a lower end opposite the upper end, and a side, having at least one open cut, the upper end having a male dovetail joinery cut adapted to connect to the female dovetail joinery cut of the bottom of the elongated bung;
a second elongated oak piece having a longitudinal axis, an upper end, a lower end opposite the upper end, and a side having at least one open cut, said upper end having a male dovetail joinery cut adapted to connect to a female dovetail joinery cut on the lower end of the first elongated oak piece;
whereby the elongated bung and the first elongated oak piece are removably connected by connecting the female dovetail joinery cut of the bottom of the elongated bung with the male dovetail joinery cut of the upper end of the first elongated oak piece, and
whereby the first elongated oak piece and the second elongated oak piece are removably connected by connecting the female dovetail joinery cut of the bottom of the first elongated oak piece with the male dovetail joinery cut of the second elongated oak piece.

19. An apparatus as in claim 18, wherein the first and second elongated oak pieces are toasted.

20. An apparatus as in claim 18, further comprising an end cap connected to the lower end of the second elongated oak piece.

21. An apparatus as in claim 1, further comprising
at least one other elongated wooden piece having a longitudinal axis, an upper end, a lower end opposite the upper end, and a side, said upper end having at least one male or female connector adapted to connect to another male or female connector on the lower end of the elongated wooden piece, wherein at least one of the elongated wooden piece and the other elongated wooden piece has at least one open cut in the side of said elongated wooden piece.

* * * * *